June 11, 1957     T. J. ERONEN     2,795,210
POULTRY FOUNTAIN
Filed Dec. 23, 1955
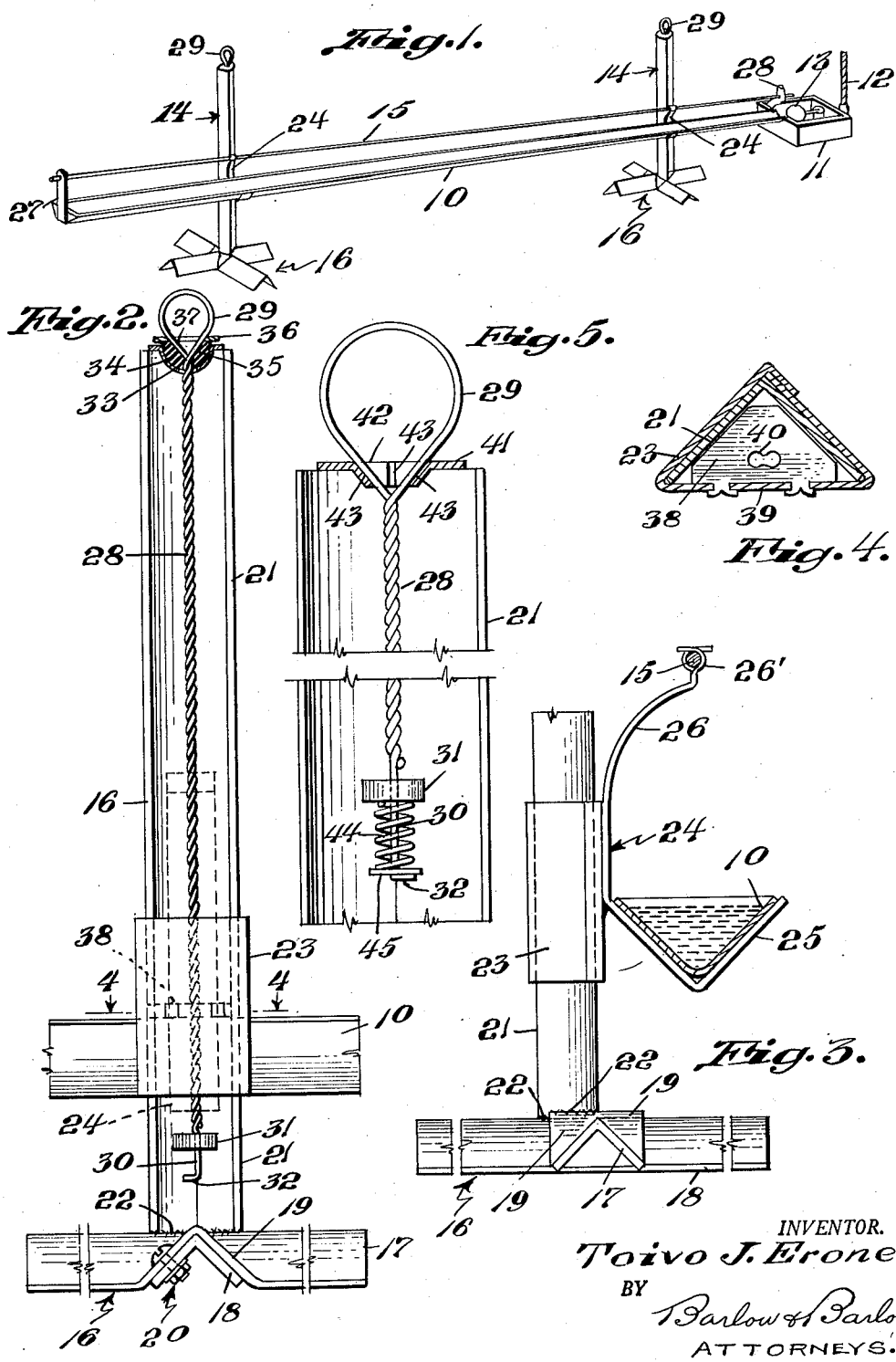
INVENTOR.
*Toivo J. Eronen*
BY
*Barlow & Barlow*
ATTORNEYS.

2,795,210
POULTRY FOUNTAIN

Toivo J. Eronen, Brooklyn, Conn.

Application December 23, 1955, Serial No. 554,980

5 Claims. (Cl. 119—78)

This invention relates to a poultry fountain, particularly a fountain or so-called waterer for use in brooding poultry from day-old chicks to maturity.

It is usual in brooding chicks to change the fountains to larger sizes progressively as the young poultry grow. This requires a large inventory of various size fountains. It is well known that young poultry do not take readily to change in equipment. This results in many of the young poultry in a relatively large flock going without water for several days while getting accustomed to the substitue fountains. This condition is undesirable in that a drop in feed intake may result. Good management requires a more or less gradual change-over of fountains and this is not desirable in that the simple task of changing fountains must be spread over a period of days.

An object of this invention is to provide a poultry fountain so constructed as to be readily adjustable for height in accordance with the requirement of the growing young poultry.

Another object of this invention is to provide a poultry fountain which will be economical to manufacture and be durable in use.

With these and other objects in view, the invention consists of certain novel features of construction as will be more fully described and particularly pointed out in the appended claims.

In the accompanying drawings:

Figure 1 is a perspective view of a poultry fountain embodying my invention;

Figure 2 is an enlarged rear elevational view of a portion of the fountain of Figure 1 showing one of the uprights in detail;

Figure 3 is an enlarged end elevational view of a portion of the fountain at one of the uprights;

Figure 4 is an enlarged sectional view taken substantially along line 4—4 of Figure 2; and Figure 5 is an enlarged view of a modified construction of the uprights.

The fountain according to the embodiment illustrated comprises a trough 10, at one end of which there is provided a well 11 which is connected to a suitable water supply (not shown) by a flexible conduit 12. The well 11 is attached to and held to the trough. Water will flow from the well into the trough to a predetermined level controlled by a float controlled valve mechanism which is conventional and indicated generally 13. This may be of any well-known suitable type which operates to maintain a predetermined water level in the well. It may be here pointed out that the water level in the trough will be that of the water level in the well 11. The trough is supported in adjusted position on a plurality of pillars or uprights 14, two being shown, but as many may be employed as is found necessary in accordance with the length of the trough. In order to prevent roosting on the trough, a wire or rod 15 is arranged to extend lengthwise of the trough in proper spaced relation therewith, the diameter of the rod being such as to provide insufficient purchase for the feet of the young poultry and thus discourage roosting.

Each upright 14 (see Figure 2) is similar to the other and comprises a base portion 16 having right angularly extending feet 17, 18 which are formed of angle iron. The foot 17 has a central V-shaped portion 19 pressed outwardly in the sides thereof to provide a recess of a shape and size conforming to and receiving the foot 18 in nested relation. The feet 17 and 18 may be secured to each other in any appropriate manner, preferably by means of bolt and nut fastenings 20 as shown. As seen in Figures 2 and 3, the pressed-out portions 19 are of a depth to allow the edges of the feet to extend flush with each other. A vertically extending post 21 of similar angle iron has one end thereof resting on the apex of the feet 17, 18 and is secured thereto by means of a weld joint indicated 22. Referring to Figure 3, it will be seen that the apex of the pressed-out portions 19 are at a higher level than the apex of the foot portion 18 and that the adjacent end of the post 21 is cut away so as to conform and rest flush on these apexes of different height.

The trough 10 is attached to a sleeve 23 (see Figure 4) which is triangular shaped in cross section to conform to the cross sectional shape of post 21 and is slidably received thereon. A bracket 24 is secured in a known manner to the sleeve 23 and the lower end portion of the bracket has an outwardly extending V formation 25 of a shape to conform to and receive the trough 10 in nested relation therewith. The upper portion 26 of the bracket curves outwardly above the trough and terminates into a curl or eye 26' which is positioned centrally crosswise of the trough and through which the rod or wire 15 passes to be supported. The ends of the rod or wire 15 are supported on brackets 27, 28 (see Figure 1) which are attached to the end of the trough and well 11, respectively.

As previously mentioned, the trough 10 is adjustably supported on the uprights 14 and to this end a shaft 28 is provided which is formed by means of a length of wire which is bent at substantially its middle into a generally circular ring or handle 29 and the two stretches of wire extend therefrom in a helical twist forming a screw threadlike formation extending from adjacent the handle 29 to near the end portion 30 of one of the stretches of the wire which is made longer than the other. The portion 30 is rotatively passed through an abutment 31 which is secured in a known manner to the inner sides of the post 21. The end 32 of portion 30 is bent at right angles, which anchors the shaft 28 to the post 21.

At the upper end of the post 21 there is attached an apertured cup 33 in which there is received a block 34 of resilient material such as rubber or the like having a central opening 35 therethrough. The shaft 28 is of a diameter small enough to be loosely passed through the opening in the cup and block 34. The sides of opening 35 are inwardly slanted and when under pressure are adapted to engage the sides of handle 29 adjacent the helical portion of the shaft 28. The block 34 extends above the edges of the cup, and a disk or washer 36 surrounds the inner portion of handle 29 and engages the block 34. Thus, the block 34 provides a resilient means acting between the cup and washer tending to move shaft 28 upwardly with respect to the post 21 and particularly to provide a locking means for the shaft. The weight of the trough and its contents will be transmitted to shaft 28, tending to move the same downwardly against the resiliency of block 34. This action will be in turn transmitted to the disk 36 which compresses the resilient block 34 and urges it against sides of handle 29 to lock the handle and shaft in adjusted position. To turn shaft 28 to adjust the height of trough 10, the handle is first pulled upwardly sufficiently to free the same of its interlocking relation with block 34 and thereafter the handle may be turned in the required direction.

A nut 38 (see Figure 4) which consists of a flat plate is secured to the wall 39 of the sleeve 23 in a known manner and projects inwardly to between the sides of the post 21. This nut 38 has an opening 40 therethrough through which the helical portion of member 28 passes and is so shaped as to provide a screw thread-like relation with shaft 28. Thus, rotating shaft 28 in one or the other direction will cause movement of the nut 38 and the sleeve 23 axially of the shaft 28, thus raising or lowering the trough 10 in response to the turning of shaft 28.

In Figure 5 I have shown a modified handle locking arrangement having a metal cup 41, the wall of which is centrally apertured as at 42 and provided with oppositely disposed grooves 43. A compression spring 44 surrounds the end portion 30 of member 28 and acts against the abutment 31 and a washer 45 attached to portion 30. This spring 44 in addition to the weight of trough 10 tends to move shaft 28 downwardly and urge handle 29 into locked engagement with the grooves 43.

From the above description, it will be apparent that the trough may be initially adjusted to a height adapted for use on very young poultry. The water level in the trough is likewise controlled by the float mechanism to a required depth. As the young poultry grows, adjustment in height of trough may be made accordingly. Thus, this feature provides for the use of the very same trough for the growing period of the young poultry.

I claim:

1. A poultry fountain comprising a trough adapted to hold a supply of water therein, a plurality of vertical uprights, a sleeve slidably received on each upright, a bracket secured to each of said sleeves for supporting said trough, a helical shaft for each upright having a handle at one end thereof and rotatively anchored at the other end to the upright, a nut secured to each of said sleeves and having screw threaded engagement with said shafts, whereby turning said shafts will move said sleeves along said upright and locking means carried by the uprights adapted to be engaged by said handle to hold the same against free turning.

2. A poultry fountain comprising a trough adapted to hold a supply of water therein, a plurality of vertical uprights, a sleeve slidably received on each upright, means for supporting said trough secured to said sleeve, a helical shaft for each upright having a handle at one end thereof and rotatively anchored at the other end to the upright, a nut secured to said sleeve and having screw threaded engagement with said shaft, and locking means carried by the uprights for engaging and locking said handle against turning, said locking means including a rubber block having an opening through which said handle passes, said block being compressible to urge the sides of said opening against said handle and hold the same against turning.

3. In a poultry feeding device comprising a trough adapted to hold a supply of feeding material therein, a vertical upright, a sleeve slidably mounted on said upright, said trough being carried by said sleeve for movement therewith, a nut secured to said sleeve for movement therewith, a manually operated helical shaft extending through said upright and having a screw threaded engagement with said nut, a handle on said shaft for turning the same to move said sleeve along said upright, lock means carried by said upright adapted to engage said handle to hold the same against free turning, and means acting on said shaft in a direction urging said handle to be moved into engagement with said lock means.

4. A poultry fountain comprising a trough adapted to hold a supply of water therein, a plurality of vertical uprights, a sleeve slidably received on each upright, a bracket for supporting said trough secured to said sleeve and co-operating means carried by each of said uprights and engaging said sleeves operable for moving said sleeves in adjusted position along said uprights, said co-operating means being two stretches of helically wound wire and a nut carried by said sleeve having screw threaded engagement with said helically wound wire.

5. A poultry foutain comprising a trough adapted to hold a supply of water therein, a plurality of vertical uprights, a sleeve slidably received on each upright, a bracket secured to said sleeve for supporting said trough, a helical shaft for each upright having a handle at one end thereof and rotatively anchored at the other end to the upright, a nut secured to said sleeve and having screw threaded engagement with said shaft, and locking means carried by the uprights for engaging and locking said handle against turning, said locking means including a rubber block having an opening therethrough through which said handle passes, said block being compressible to urge the sides of said opening against said handle and hold the same against turning.

References Cited in the file of this patent

UNITED STATES PATENTS

| | | |
|---|---|---|
| 1,558,316 | Tipple | Oct. 20, 1925 |
| 2,703,099 | Smallegan | Mar. 1, 1955 |
| 2,719,509 | Kitson | Oct. 4, 1955 |

OTHER REFERENCES

Montgomery Ward Catalog, 1954 Spring and Summer volume, page 757, item 39.